United States Patent
Jose et al.

(10) Patent No.: US 9,584,954 B2
(45) Date of Patent: Feb. 28, 2017

(54) INTER-FRAME SPACING ADAPTATION FOR YIELDING TO DSRC OPERATION

(71) Applicant: QUALCOMM Incorporated, San Diego, CA (US)

(72) Inventors: Jubin Jose, Bound Brook, NJ (US); Ying Wang, Easton, PA (US); Sundar Subramanian, Somerville, NJ (US); Xinzhou Wu, Monmouth Junction, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 13/920,638

(22) Filed: Jun. 18, 2013

(65) Prior Publication Data
US 2014/0370809 A1    Dec. 18, 2014

(51) Int. Cl.
| | | |
|---|---|---|
| *H04W 4/00* | (2009.01) | |
| *H04W 74/08* | (2009.01) | |
| *H04W 16/14* | (2009.01) | |
| *H04W 84/10* | (2009.01) | |
| *H04W 88/06* | (2009.01) | |

(52) U.S. Cl.
CPC ....... *H04W 4/008* (2013.01); *H04W 74/0816* (2013.01); *H04W 16/14* (2013.01); *H04W 84/10* (2013.01); *H04W 88/06* (2013.01)

(58) Field of Classification Search
CPC combination set(s) only.
See application file for complete search history.

(56) References Cited

U.S. PATENT DOCUMENTS

| | | |
|---|---|---|
| 8,023,939 B2 | 9/2011 | Good et al. |
| 2003/0012166 A1 | 1/2003 | Benveniste |
| 2006/0189309 A1 | 8/2006 | Good et al. |
| 2007/0132515 A1* | 6/2007 | Lee et al. ............. 331/1 A |
| 2010/0015971 A1* | 1/2010 | Good ............. H04B 7/18563 455/427 |
| 2013/0051335 A1 | 2/2013 | Adachi et al. |
| 2013/0294356 A1* | 11/2013 | Bala et al. ............. 370/329 |

FOREIGN PATENT DOCUMENTS

| | | |
|---|---|---|
| KR | 20070016372 A | 2/2007 |
| WO | 2008071848 A1 | 6/2008 |
| WO | WO-2012040520 A1 | 3/2012 |

OTHER PUBLICATIONS

ISA/EPO, International Search Report and Written Opinion of the International Searching Authority, Int'l. App. No. PCT/US2014/041933, Nov. 5, 2014, European Patent Office, Rijswijk, NL, 13 pgs.

(Continued)

Primary Examiner — Junpeng Chen
(74) Attorney, Agent, or Firm — Holland & Hart LLP

(57) ABSTRACT

Methods, systems, and devices are described for adapting access timing parameters when using DSRC spectrum. A multi-mode device may adapt at least one access timing parameter while operating within the DSRC spectrum. The at least one access timing parameter may be adapted to provide priority to transmissions of DSRC devices using the DSRC spectrum. The multi-mode device may increase a duration of a short inter-frame spacing (SIFS) to be at least equal to a duration of a SIFS used by a DSRC device.

40 Claims, 11 Drawing Sheets

(56) References Cited

OTHER PUBLICATIONS

Park et al., "On the Coexistence of IEEE 802.11ac and WAVE in the 5.9 GHz Band," IEEE Communications Magazine, Jun. 2014, pp. 162-168, vol. 52, Issue: 6, ISSN 0163-6804, Institute of Electrical and Electronics Engineers.

Doyle N.C., et al., "Improvement in Vehicular Networking Efficiency Using a New Combined WiMAX and DSRC System Design," IEEE, 2011, pp. 42-47.

IPEA/EPO, Second Written Opinion of the International Preliminary Examining Authority, Int'l. App. No. PCT/US2014/041933, May 20, 2015, European Patent Office, Munich, DE, 9 pgs.

* cited by examiner

INTER-FRAME SPACING ADAPTATION FOR YIELDING TO DSRC OPERATION

BACKGROUND

The following relates generally to wireless communication, and more specifically to adaptively modify access timing parameters when using the dedicated short range communication (DSRC) spectrum. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. The available bandwidth for transmissions affects the data rate and throughput of the transmissions. As the bandwidth increases, the data rate may also increase.

Multi-mode devices, such as devices that may communicate on cellular and Wi-Fi networks, and/or devices that may communicate on different available Wi-Fi networks, may desire to use an increased amount of bandwidth for their transmissions. The bandwidth allocated to devices operating in the DSRC spectrum is typically used for DSRC-related transmissions. If a multi-mode device expands its bandwidth using the DSRC spectrum, it may cause interference to these DSRC-related transmissions. Thus, techniques to minimize interference to DSRC-related transmissions are desired when the DSRC spectrum is shared with devices performing non-DSRC transmissions.

SUMMARY

Management of the use and sharing of a dedicated short range communications (DSRC) spectrum for wireless communications is described. The use and sharing of the DSRC spectrum by multi-mode devices may be accomplished by allowing the devices to operate as secondary users to primary DSRC devices in the DSRC spectrum. Multi-mode devices may control their use of the DSRC spectrum through changing various parameters, such as maximum transmit power, maximum packet duration, intervals between DSRC spectrum sensing, beam forming, timing parameters such as inter-frame spacing (IFS) parameters, slot time, transmit opportunity (TXOP), and minimum and maximum contention window sizes, for example.

In one embodiment, a method for adapting access timing parameters when using DSRC spectrum is described. In one example, the method may include a multi-mode device adapting at least one access timing parameter while operating within the DSRC spectrum, the at least one access timing parameter being adapted to provide priority to transmissions of DSRC devices using the DSRC spectrum. A multi-mode device may, for example, increase a duration of a short inter-frame spacing (SIFS) to be at least equal to a duration of a SIFS used by a DSRC device.

In one embodiment, a method for adapting access timing parameters when using a dedicated short range communications (DSRC) spectrum is described. In one example, at least one access timing parameter of a multi-mode device operating outside of the DSRC spectrum is adapted to operate within the DSRC spectrum. The at least one access timing parameter may be adapted to provide priority to transmissions of DSRC devices using the DSRC spectrum.

The adaptation of the at least one access timing parameter may include one or more of increasing a duration of a short inter-frame spacing (SIFS) to be at least equal to a duration of a SIFS used by a DSRC device, increasing a slot-time used for access timing to be at least equal to a slot-time used for access timing of a DSRC device, or adapting a backoff timer used by the multi-mode device. In one configuration, the increased slot-time may be used to compute an increased duration of a distributed coordination function (DCF) inter-frame spacing (DIFS), an increased duration of an extended inter-frame spacing (EIFS), and/or an increased duration of an arbitration inter-frame spacing (AIFS).

In some examples, the method may further include determining an activity level of DSRC transmissions within the DSRC spectrum, and determining whether to use the DSRC spectrum for non-DSRC transmissions based at least in part on the determined activity level of DSRC transmissions. Upon determining to use the DSRC spectrum, in an example, the at least one access timing parameter of the multi-mode device may be adapted based at least in part on the determined activity level of DSRC transmissions. In other examples, the method may further include identifying a first time period comprising a first activity level of DSRC transmissions, identifying a second time period comprising a second activity level of DSRC activities, the second activity level being different from the first activity level, adapting the at least one access timing parameter according to a first adaptation during the first time period, and adapting the at least one access timing parameter according to a second adaptation during the second time period, the second adaption being different from the first adaptation.

In further examples, the method may also include one or more of: transmitting an activity level within the DSRC spectrum; receiving an instruction from an access point (AP) indicating the adaptation to apply to the at least one access timing parameter of the multi-mode device, the instruction based at least in part on an activity level within the DSRC spectrum; or adapting the at least one access timing parameter of the multi-mode device operating within the DSRC spectrum to operate outside the DSRC spectrum.

An apparatus for adapting access timing parameters when using a DSRC spectrum is also described. The apparatus may include means for adapting at least one access timing parameter of a multi-mode device operating outside of the DSRC spectrum to operate within the DSRC spectrum, the at least one access timing parameter being adapted to provide priority to transmissions of DSRC devices using the DSRC spectrum.

A multi-mode device configured to adapt access timing parameters when using a DSRC spectrum is also described. The device may include a processor and a memory in electronic communication with the processor. Instructions may be stored in the memory. The instructions may also be executable by the processor to adapt at least one access timing parameter of a multi-mode device operating outside of the DSRC spectrum to operate within the DSRC spectrum, the at least one access timing parameter being adapted to provide priority to transmissions of DSRC devices using the DSRC spectrum.

A computer program product to adapt access timing parameters when using a DSRC spectrum is also described. The computer program product may include a non-transitory computer-readable medium storing instructions executable by a processor to adapt at least one access timing parameter of a multi-mode device operating outside of the DSRC spectrum to operate within the DSRC spectrum, the at least one access timing parameter being adapted to provide priority to transmissions of DSRC devices using the DSRC spectrum.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
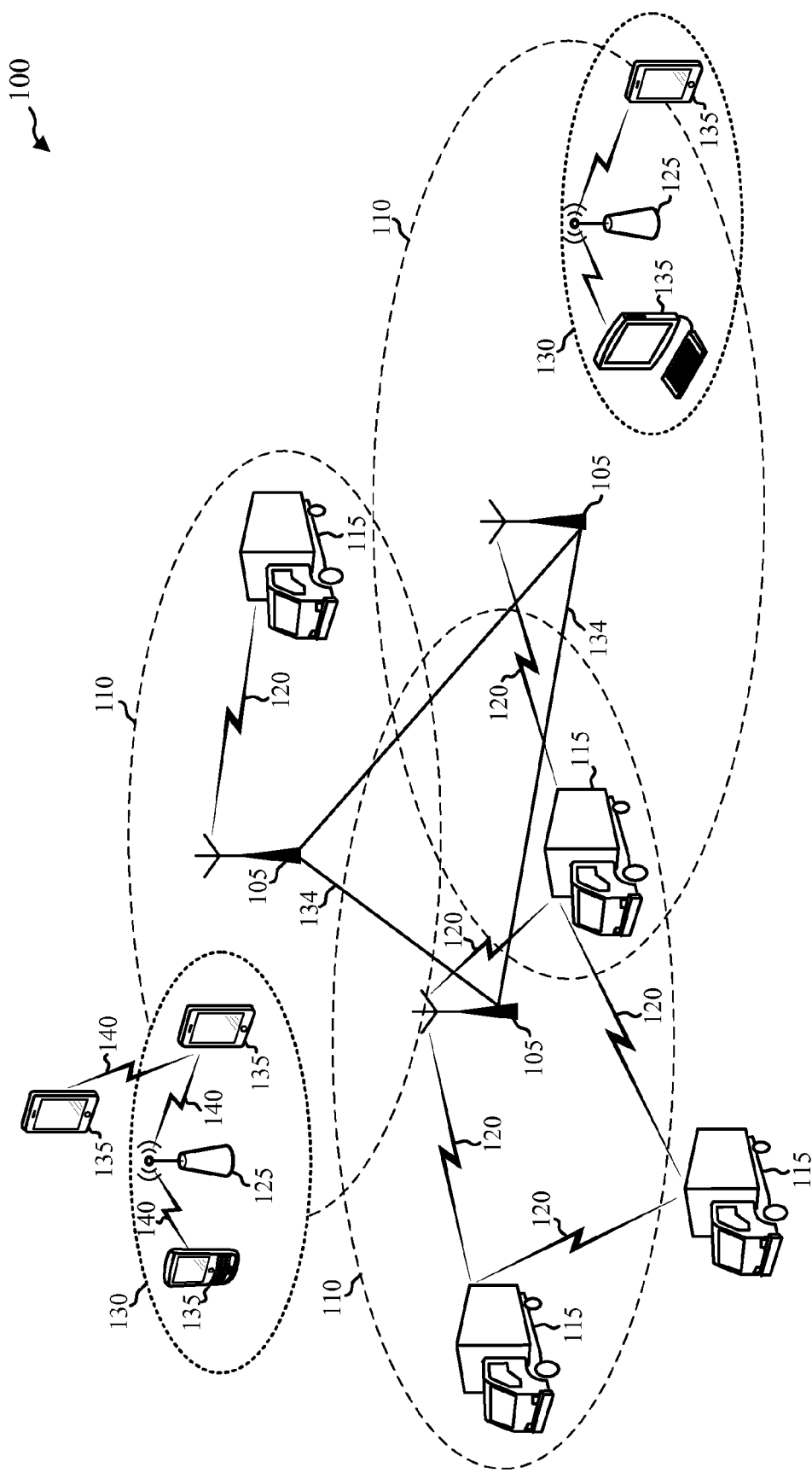
FIG. 1 shows a block diagram of a wireless communications system.

Information and data may be transferred more quickly and efficiently based on the amount of available bandwidth. The size of the bandwidth (e.g., the width) may be the difference between the highest frequency and the lowest frequency in a continuous range of frequencies (typically measured in Hertz, for example). Often, the data rate limit (e.g., channel capacity, amount of information that can be transferred) is proportional to the size of the bandwidth. For example, 80 MHz of bandwidth will have a higher data rate limit than 40 MHz of bandwidth. As a result, in order to support higher data rates, more bandwidth may be required. Bandwidth occupies at least a portion of a spectrum (e.g., radio spectrum). As a result, an increase in bandwidth requires an increase in spectrum. However, additional spectrum may be difficult to obtain.

In most cases, spectrum use is regulated (e.g., allocated). For example, in the United States, spectrum use is regulated by the Federal Communications Commission (FCC). In the United States, the FCC has allocated the 5.15-5.25 GHz (e.g., U-NII 1), 5.25-5.35 GHz (e.g., U-NII 2), 5.47-5.725 GHz (e.g., U-NII WW), and 5.725-5.825 GHz (e.g., U-NII 3) frequency bands as Unlicensed National Infrastructure (U-NII) spectrum and the 5.85-5.925 GHz frequency band as dedicated short range communication (DSRC) spectrum. Thus, bandwidth may be constrained to the space allotted in the allocated spectrum. As a result, it may not be possible to increase the available bandwidth (or the data rate limit, for example) due to the finite constraints of the allocated spectrum. As will be discussed below, spectrum sharing may be used to increase the available bandwidth.

In one example, the systems and methods described herein may enable multimode devices that operate in the U-NII spectrum band to enable opportunistic use of the DSRC spectrum band to increase bandwidth. For instance, the systems and methods described herein may enable U-NII users (e.g., unlicensed Wi-Fi users) to use the DSRC spectrum while maintaining higher priority access to the spectrum for other DSRC devices. In some configurations, the multi-mode devices may adapt one or more timing parameters to provide priority to transmissions of DSRC devices using the DSRC spectrum. As used herein, a multi-mode device may be a Wi-Fi device capable of operating in the DSRC spectrum and outside of the DSRC spectrum. The multi-mode device may also be a device capable of operating in multiple networks, such as, but not limited to, a Wi-Fi network, a WLAN, a cellular network, etc. In one embodiment, the multi-mode device may not have cellular support and may be unable to communicate on a cellular network.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes DSRC base stations 105 and DSRC devices 115 operating within the DSRC spectrum (in a DSRC communications system, for example). The system 100 also includes access points 125 and multi-mode devices 135 operating outside of the DSRC spectrum. In one example, the access points 125 and the multi-mode devices 135 may operate in the U-NII spectrum (in a Wi-Fi communication system, for example).

The FCC initially allocated the DSRC spectrum for automotive use (e.g., intelligent transportation systems). Examples of DSRC communications include emergency warnings for vehicles, cooperative adaptive cruise control, cooperative collision warning, intersection collision avoidance, electronic parking payments, in vehicle signaling, electronic toll collection, etc. DSRC communication links 120 may exist between a DSRC device 115 and a DSRC base station 105 or between a DSRC device 115 and another DSRC device 115. In some cases, DSRC communication links 120 between DSRC devices 115 may occur outside of a coverage area 110 of the DSRC base station 105. In some embodiments, the DSRC base stations 105 may communicate, either directly or indirectly, with each other over backhaul links 134, which may be wired or wireless communication links.

The DSRC devices 115 are dispersed throughout the wireless communication system 100, and each DSRC device 115 may be stationary or mobile. A DSRC device 115 may be a vehicle, traffic signal, railroad crossing, base station, cellular phone, a personal digital assistant (PDA), or the like. A DSRC device 115 may be able to communicate with the DSRC base station 105 and other DSRC devices 115. Each DSRC base station 105 may provide communication coverage for a respective DSRC geographical area 110.

Multi-mode devices 135 may also be dispersed through the wireless communication system 100. Each device 135 may be stationary or mobile. A device 135 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment, a mobile client, a client, or some other suitable terminology. A multi-mode device 135 may be, for example, a cellular phone, a personal digital assistant (PDA), a wireless modem, a wireless communication device, a handheld device, a tablet computer, a laptop computer, a cordless phone, a wireless local loop (WLL) station, or the like.

A multi-mode device 135 may be able to communicate with access points 125 and/or other multi-mode devices 135. Each of the access point 125 sites may provide communication coverage for a respective communications geographic area 130. Communication links 140 may provide communications between a device 135 and an access point 125 and/or a multi-mode device 135. In some embodiments, access points 125 may be referred to as a base transceiver station, a radio base station, a radio transceiver, a basic service set (BSS), an extended service set (ESS), a NodeB, eNodeB (eNB), Home NodeB, a Home eNodeB, or some other suitable terminology. The coverage area 130 for an access point 125 may be divided into sectors making up only a portion of the coverage area (not shown).

The communications system 100 may also support operation on multiple carriers (waveform signals of different frequencies). Multi-carrier transmitters can transmit modulated signals simultaneously on the multiple carriers. For example, each communication link 140 (and DSRC communication link 120, for example) may be a multi-carrier signal modulated according to the various radio technologies. Each modulated signal may be sent on a different carrier and may carry control information (e.g., reference signals, control channels, etc.), overhead information, data, etc.

As is shown in FIG. 1, the coverage area 130 of access points 125 may overlap with the coverage areas 110 of the DSRC base stations 105. In the typical scenario, the overlapping coverage areas (or overlapping use outside of one or more coverage areas, for example) may not result in interference because the DSRC communication system is operating in the DSRC spectrum while the other communications system is operating outside of the DSRC spectrum (in the U-NII spectrum, for example). However, in some embodiments, the systems and methods described herein describe techniques for sharing of the DSRC spectrum by the access point 125 and/or the multi-mode devices 135, which could result in interference for the DSRC communication system. In one example, a multi-mode communications device 135 may adapt an access timing parameter to provide priority to transmissions using the DSRC spectrum. The device 135 may, for example, increase a duration of a short inter-frame spacing (SIFS) to be at least equal to a duration of a SIFS used by a DSRC device, and thereby provide the DSRC device with a higher priority for transmissions using the DSRC spectrum. Additionally or alternatively, the multi-mode communications device 135 may opportunistically use at least a portion of the DSRC spectrum based on the activity level of the DSRC devices 115 currently operating in the DSRC spectrum. Additionally or alternatively, the multi-mode communications device 135 may determine location information that indicates the current location of the device and begin to operate within the DSRC spectrum, for example, if it is located a certain distance away from areas that are attributed to DSRC transmissions, such as road, highways, airports, etc. Additionally or alternatively, the multi-mode communications device 135 may use a first clock rate while operating outside of the DSRC spectrum and may switch to a second clock rate to detect transmissions using the DSRC spectrum.

Figure 2:
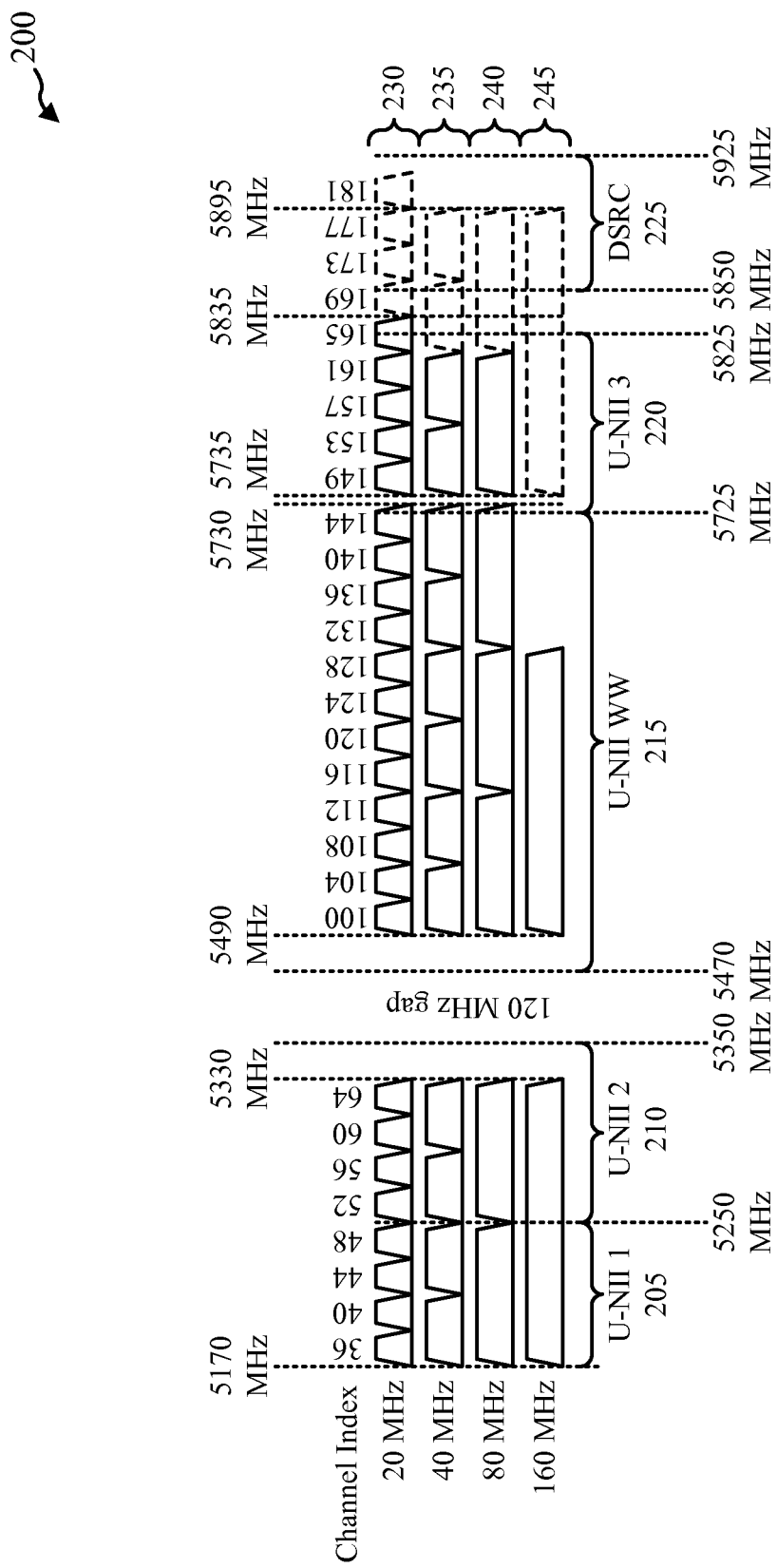
FIG. 2 is a diagram illustrating frequency band allocations along a frequency spectrum.

FIG. 2 shows an exemplary view of the various spectrum allocations in the 5 GHz spectrum 200. As illustrated in FIG. 2, the 5 GHz spectrum 200 includes the U-NII 1 frequency band 205 (e.g., 5170-5250 MHz), the U-NII 2 frequency band 210 (e.g., 5250-350 MHz), the U-NII WW frequency band 215 (e.g., 5470-5725 MHz), the U-NII 3 frequency band 220 (e.g., 5725-5825 MHz), and the DSRC frequency band 225 (e.g., 5850-5925 MHz).

Each frequency band may be allocated to use one or more channels. Each channel may occupy bandwidth (e.g., 10 MHz, 20 MHz, 40 MHz, 80 MHz, 160 MHz, etc.). As noted above, increased bandwidth may result in higher data rates. As a result, increasing the number of channels and/or increasing the bandwidth of the channels may be desirable. Unfortunately, spectrum allocations may limit the number and/or the size of channels. For example, the U-NII 1 frequency band 205 (which occupies 80 MHz, for example) may support up to four 20 MHz channels 230 (with channel indexes 36, 40, 44, and 48, for example), up to two 40 MHz channels 235, or one 80 MHz channel 240. Similarly, the U-NII 2 frequency band 210 may support up to four 20 MHz channels 230 (with channel indexes 52, 56, 60, and 64, for example), up to two 40 MHz channels 235, or one 80 MHz channel 240. As a result, neither the U-NII 1 frequency band 205 nor the U-NII 2 frequency band 210 may individually support a 160 MHz channel 245. Certain devices (e.g., Wi-Fi device) may operate across both the U-NII 1 and U-NII 2 frequency bands 205, 210. As a result the U-NII 1 and U-NII 2 frequency bands 205, 210 may effectively be combined to result in a 5170-5350 MHz frequency band. Accordingly, a 160 MHz channel 245 (e.g., 5170-5330 MHz) may be supported.

As illustrated in FIG. 2, the U-NII 3 frequency band 220 (e.g., 5725-5825 MHz) may support up to five 20 MHz channels 230 (with channel indexes 149, 153, 157, 161, and 165, for example), up to two 40 MHz channels 235, or one 80 MHz channel 240. Typically, the DSRC frequency band 225 supports DSRC communications using 10 MHz channels. In some cases, the systems and methods described herein may opportunistically use the DSRC frequency band (as secondary users, for example). In one embodiment, multi-mode devices may use the DSRC spectrum and adapt an access timing parameter to provide priority to transmissions using the DSRC spectrum. As a result, the U-NII 3 and DSRC frequency bands 220, 225 may effectively be combined to result in a 5725-5925 MHz frequency band. Accordingly, the combined frequency bands may support up to nine 20 MHz channels 230 (with channel indexes 149, 153, 157, 161, 165, 169, 173, 177, and 181, for example), up to four 40 MHz channels 235, up to two 80 MHz channels 240, and up to one 160 MHz channel 245. Thus, sharing of the DSRC spectrum may substantially increase the number of the available channels and/or the size of the available channels. In one example, spectrum sharing across the U-NII and DSRC frequency bands may support up to twenty nine 20 MHz channels 230, up to fourteen 40 MHz channels 235, up to seven 80 MHz channel 240, and up to three 160 MHz channels 245. These increases may enable increased data rates (allowing for higher throughput, for example). For instance, the increased data rates may be used to transmit high definition video formats (Ultra High Definition Television (UHDTV), for example).

Figure 3:
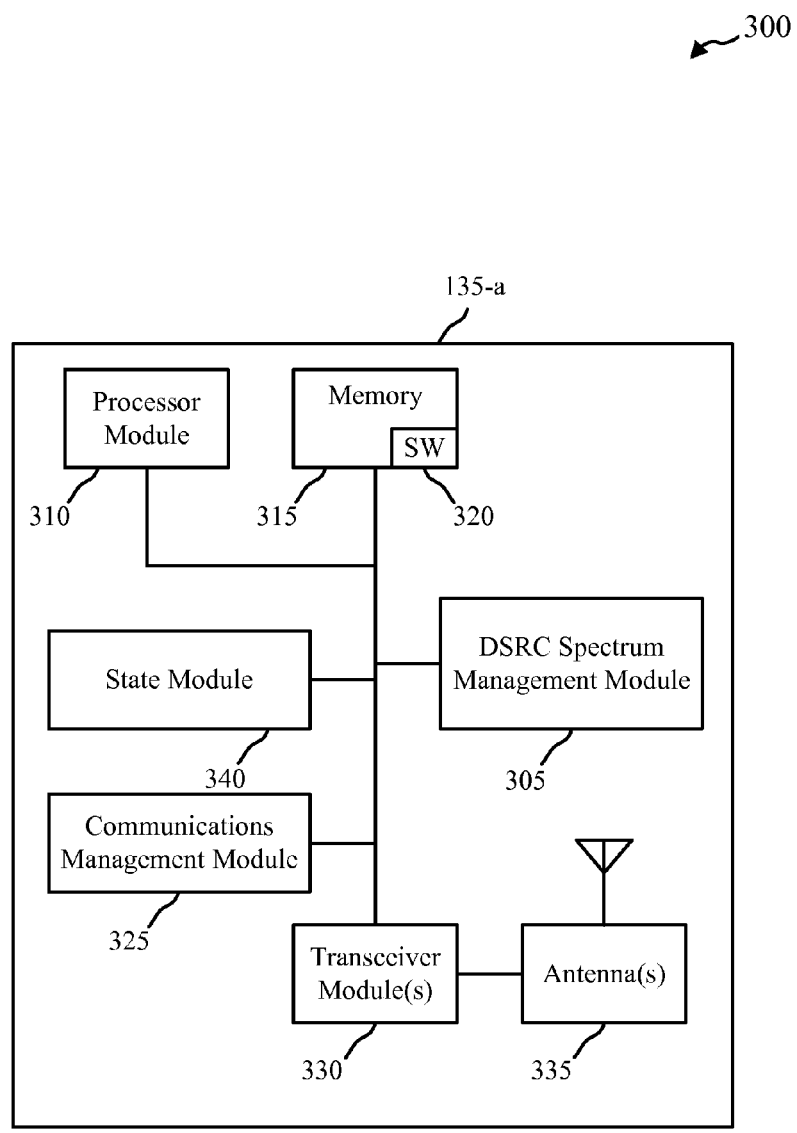
FIG. 3 shows a block diagram illustrating one example of a multi-mode device.

FIG. 3 is a block diagram 300 of a multi-mode device 135-a. This may be the multi-mode device 135 of FIG. 1. The device 135-a may have any of various configurations, such as Wi-Fi devices, personal computers (e.g., laptop computers, netbook computers, tablet computers, etc.), cellular telephones, PDAs, digital video recorders (DVRs), internet appliances, gaming consoles, e-readers, etc. The device 135-a may have an internal power supply (not shown), such as a small battery, to facilitate mobile operation.

The device 135-a includes antennas 335, a transceiver module 330, memory 315, and a processor module 310, which each may be in communication, directly or indirectly, with each other (e.g., via one or more buses). The transceiver module 330 is configured to communicate bi-directionally, via the antennas 335 and/or one or more wired or wireless links, with one or more networks, as described above. For example, the transceiver module 330 may be configured to communicate bi-directionally with access points 125 of FIG. 1. The transceiver module 330 may include a modem configured to modulate the packets and provide the modulated packets to the antennas 335 for transmission, and to demodulate packets received from the antennas 335. While the device 135-a may include a single antenna, the multi-mode device 135-a may include multiple antennas 335 for multiple links.

The memory 315 may include random access memory (RAM) and/or read-only memory (ROM). The memory 315 may store computer-readable, computer-executable software code 320 containing instructions that are configured to, when executed, cause the processor module 310 to perform various functions described herein (e.g., DSRC management, access timing parameter adaptation, etc.). Alternatively, the software 320 may not be directly executable by the processor module 310 but be configured to cause the computer (e.g., when compiled and executed) to perform functions described herein.

The processor module 310 may include an intelligent hardware device, e.g., a central processing unit (CPU), a microcontroller, an application specific integrated circuit (ASIC), etc. The processor module 310 may include a speech encoder (not shown) configured to receive audio via a microphone, convert the audio into packets (e.g., 30 ms in length) representative of the received audio, provide the audio packets to the transceiver module 330, and provide indications of whether a user is speaking. Alternatively, an encoder may only provide packets to the transceiver module 330, with the provision or withholding/suppression of the packet itself providing the indication of whether a user is speaking.

According to the architecture of FIG. 3, the device 135-a further includes a communications management module 325 and a state module 340. The communications management module 325 may manage communications with other devices 135. By way of example, the communications management module 325 may be a component of the multi-mode device 135-a in communication with some or all of the other components of the multi-mode device 135-a via a bus. Alternatively, functionality of the communications management module 325 may be implemented as a component of the transceiver module 330, as a computer program product, and/or as one or more controller elements of the processor module 310. The state module 340 may reflect and control the current device state (e.g., context, authentication, base station association, other connectivity issues).

The device 135-a may further include a DSRC spectrum management module 305. The management module 305 may manage whether the device 135-a operates within the dedicated DSRC spectrum. The module 305 may make the determination to operate within the dedicated spectrum based on a number of factors. For example, the module 305 may allow operations within the spectrum based on the current activity level within the DSRC spectrum from other devices. The management module 305 may modify one or more parameters or operations of the device 135-a to detect the activity of devices operating in the DSRC spectrum. In addition, the decision to allow the device 135-a to operate within the spectrum may be based on the current location of the multi-mode device 135-a. While operating in the DSRC spectrum, the management module 305 may alter one or more communication parameters of the multi-mode device 135-a. These parameters may be altered to provide priority to communications originating from devices that are attributed to DSRC transmissions. In some examples, the management module 305 may adapt an access timing parameter to provide priority to transmissions of DSRC devices using the DSRC spectrum.

The components of the device 135-a may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the device 135-a.

Figure 4:
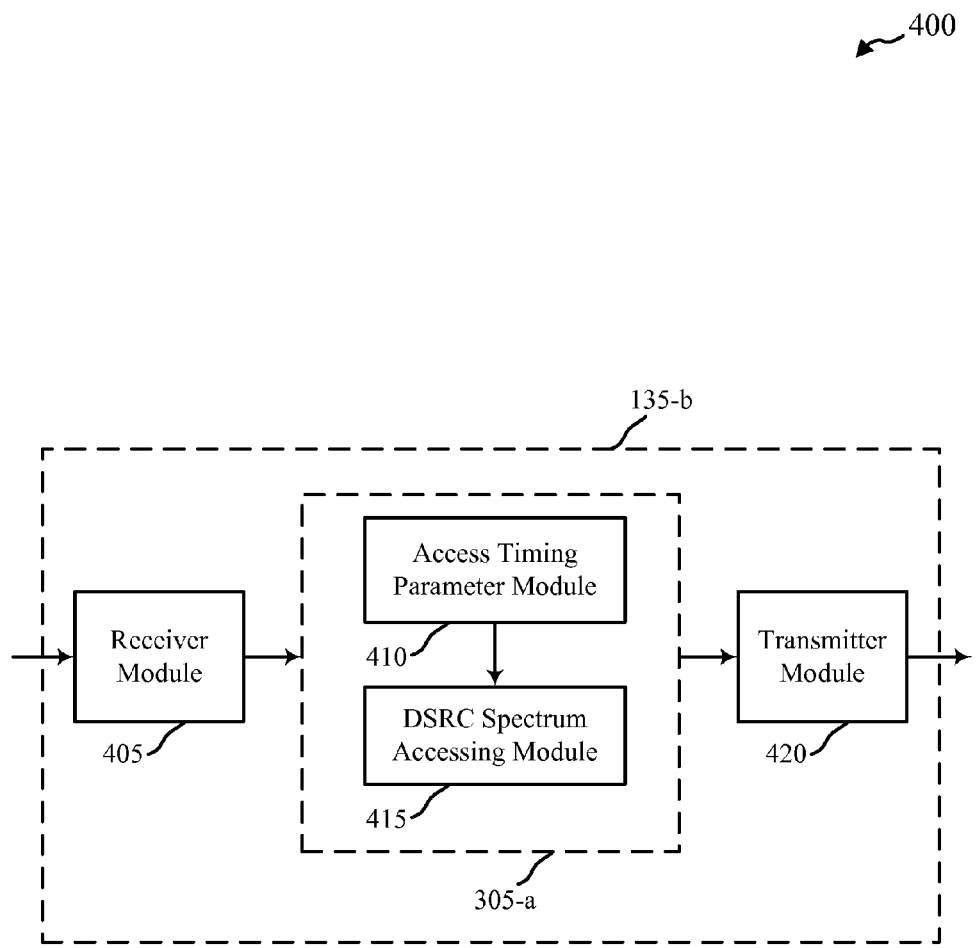
FIG. 4 shows a block diagram illustrating another example of the multi-mode device that may adapt one or more timing parameters when using the DSRC spectrum for communications.

FIG. 4 is a block diagram 400 illustrating an example of a multi-mode device 135-b that may be used to manage the use of the DSRC spectrum for communications. The device 135-b may be an example of one or more aspects of the multi-mode devices 135 described with reference to FIGS. 1 and/or 3. The device 135-b may include a receiver module

405, a DSRC spectrum management module 305-*a*, and a transmitter module 420. Each of these components may be in communication with each other.

The components of the multi-mode device 135-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 405 may be a Wi-Fi receiver and may receive various Wi-Fi signals. The receiver module 405 may be a cellular receiver, and in some cases may be an LTE/LTE-A receiver. In some cases, the receiver may operate to receive signals in the U-NII spectrum (in a Wi-Fi communication system, for example). In any event, the receiver module 405 may be used to receive various types of data and/or control signals over a wireless communications system, such as the wireless communication system 100 shown in FIG. 1. The data and/or control signals may include signals indicating the availability of resources for an uplink grant. The receiver module 405 may be configured to receive data and/or control signals using a portion of the DSRC spectrum.

The transmitter module 420 may also be a Wi-Fi transmitter capable of transmitting over a Wi-Fi connection. The transmitter 420 may be a cellular transmitter, and in some cases may be an LTE/LTE-A transmitter. In some cases, the transmitter may operate to transmit signals in the U-NII spectrum (in a Wi-Fi communication system, for example). In any event, the transmitter module 420 may be used to transmit various types of data and/or control signals over a wireless communications system such as the wireless communications system 100. The data and/or control signals may also be transmitted using a portion of the DSRC spectrum.

The DSRC spectrum management module 305-*a* may determine whether data and/or control signals may be received/transmitted using the DSRC spectrum. In one embodiment, the module 305-*a* may include an access timing parameter module 410 and a DSRC spectrum accessing module 415. In one example, the access timing parameter module 410 may adapt one or more access timing parameters when the transmitter and/or receiver are operating using the DSRC spectrum. In one configuration, the DSRC spectrum accessing module 415 may access at least a portion of the DSRC spectrum based at least in part on the access timing parameters determined by the access timing parameter module 410.

For example, the multi-mode device 135-*b* initially may be operating outside of the DSRC spectrum, and the access timing parameter module 410 may adapt one or more access timing parameter(s) to operate within the DSRC spectrum. The access timing parameter(s) may be adapted to provide priority to transmissions of DSRC devices using the DSRC spectrum. The access timing parameter module 410 may, for example, increase a duration of a short inter-frame spacing (SIFS) to be at least equal to a duration of a SIFS used by a DSRC device. Additionally or alternatively, the access timing parameter module 410 may increase a slot-time used for access timing to be at least equal to a slot-time used for access timing of a DSRC device. Such an increased slot-time may be used to compute one or more of an increased duration of a distributed coordination function (DCF) inter-frame spacing (DIFS), an increased duration of an extended inter-frame spacing (EIFS), or an increased duration of an arbitration inter-frame spacing (AIFS). In some cases, the access timing parameter module 410 may adapt a backoff timer used by the multi-mode device 135-*b*. The access timing parameter module 410 may, in some examples, receive an instruction from an access point (AP) indicating the adaptation to apply to the access timing parameter(s). In other examples, the access timing parameter module 410 may autonomously determine the access timing parameter(s) based on one or more conditions, such as an activity level within the DSRC spectrum of DSRC devices. In still other examples, the access timing parameter module 410 may adapt the access timing parameter(s) of the multi-mode device 135-*b* that is operating within the DSRC spectrum to operate outside the DSRC spectrum.

Figure 5:
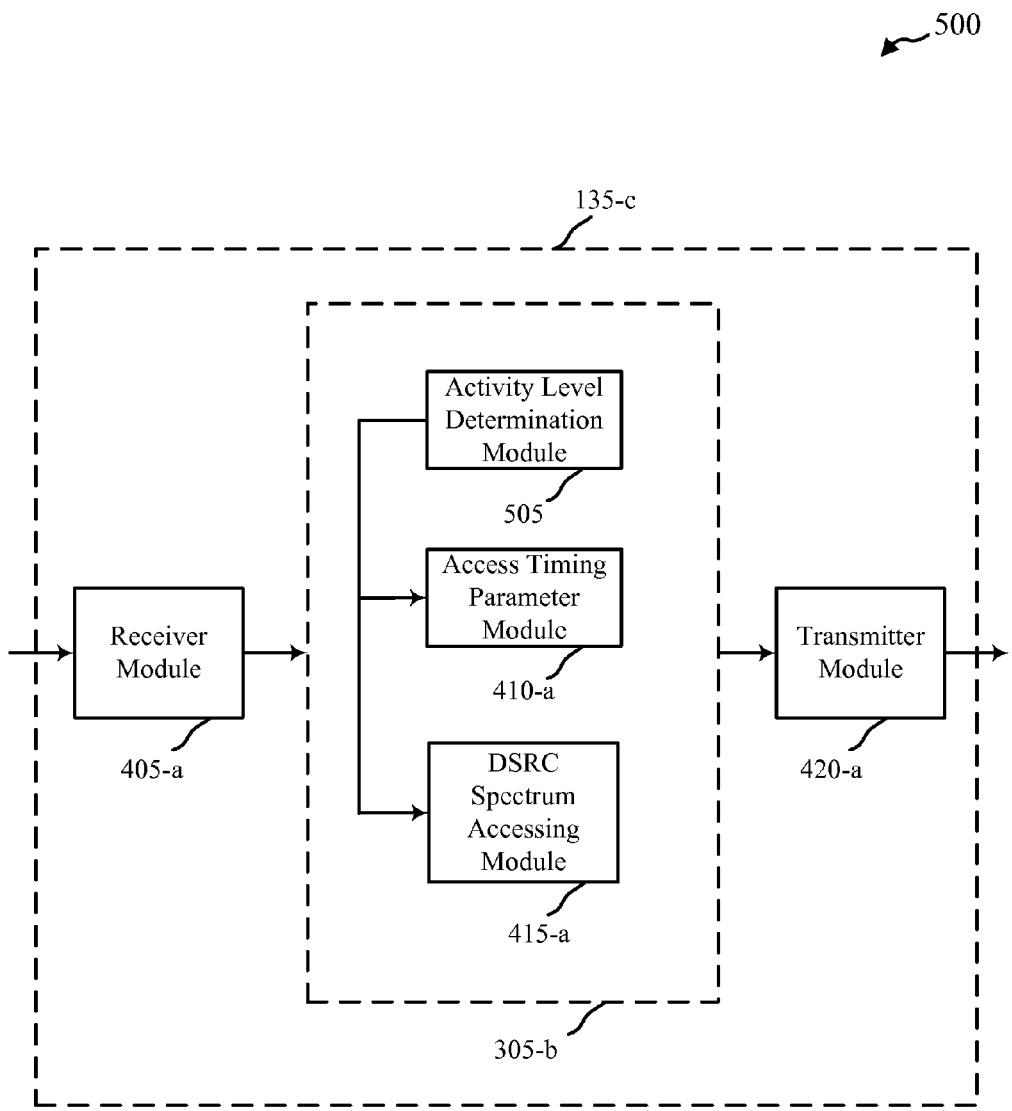
FIG. 5 is a block diagram illustrating an example of the multi-mode device that may operate using at least a portion of the DSRC spectrum.

FIG. 5 is a block diagram 500 illustrating an example of a multi-mode device 135-*c* that may operate using at least a portion of the DSRC spectrum. The device 135-*c* may be an example of one or more aspects of the multi-mode devices 135 described with reference to FIGS. 1, 3, and/or 4. The device 135-*c* may include a receiver module 405, a DSRC spectrum management module 305-*b*, and a transmitter module 420. Each of these components may be in communication with each other.

The components of the multi-mode device 135-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the receiver module 405 and the transmitter module 420 may be configured to operate as previously described above. The DSRC management module 305-*b* may include an activity level determination module 505 and an access timing parameter module 410-*a*, and a DSRC spectrum accessing module 415-*a*. The activity level determination module 505 may, in some examples, determine an activity level of DSRC transmissions within the DSRC spectrum. Such a determination may be made, for example by monitoring for transmissions of DSRC devices within the DSRC spectrum. Based on the activity level of DSRC transmissions, the DSRC spectrum accessing module 415-*a* may determine whether to use the DSRC spectrum for non-DSRC transmissions. In some embodiments, upon determining to use the DSRC spectrum, the access timing parameter module 410-*a* may adapt one or more access timing parameter of the multi-mode device 135-*c*. In some examples, the timing parameter adaptation may be based at least in part on the determined activity level of DSRC transmissions. For example, access timing parameter module 410-*a* may increase a duration of a SIFS to be at least equal to a duration of a SIFS used by a DSRC device at relatively low levels of DSRC activity, and may further increase the duration of the SIFS at higher levels of DSRC activity. If DSRC activity exceeds a threshold amount, the DSRC spectrum accessing module 415-a may simply continue using non-DSRC spectrum if multi-mode device 135-c is not using DSRC spectrum, or may switch the device 135-c away from DSRC spectrum use if the multi-mode device 135-c is using DSRC spectrum.

In some examples, the device 135-c may operate in the DSRC spectrum, and the DSRC spectrum accessing module 415-a may restrict the DSRC spectrum use through a low-priority Quality of Service (QoS) class. The QoS class may be determined, in some examples, by the modifying a value of SIFSN used in the equation AIFS=SIFS+SIFSN*slot-time, where AIFS is an arbitration inter-frame spacing. Lower priority may be given, for example, to device 135-c while operating in the DSRC spectrum by choosing a relatively large value for SIFSN. Additionally or alternatively, a minimum and maximum value of a contention-window (CW) may be changed to longer values when device 135-c operates in the DSRC spectrum, thereby providing a relatively lower QoS.

Further, to accommodate single-channel radios (only receive or transmit on a single 10 MHz channel but not simultaneously), DSRC standards allow a FDMA/TDMA channel access mechanism. According to this mechanism, time is divided into repetitive 100 ms periods. The first 50 ms may be allocated to a control channel (CCH) and the second 50 ms may be allocated to a shared channel (SCH). Many safety-type messages of DSRC communications will be sent on the CCH during the first 50 ms period. As a result, many important DSRC activities may occur during the first 50 ms of each 100 ms period. In some embodiments, multi-mode device 135-c may change access timing parameters differently for each of the 50 ms periods. For example, during the first 50 ms period, the access timing parameter module 410-a may change one or more access timing parameters to be longer than the access timing parameters used by DSRC devices so as to provide the DSRC devices with an increased priority to use the DSRC spectrum during this first 50 ms of each 100 ms period. During the second 50 ms period, the access timing parameter module 410-a may change the one or more access timing parameters to be equal to the parameters used by DSRC devices. Such a determination may be made, for example, by activity level determination module 505, which, according to some examples, may identify a first time period having a first activity level of DSRC transmissions, and identify a second time period having a second activity level of DSRC activities, the second activity level being different from the first activity level. The first and second time periods may correspond, for example to the first and second 50 ms of each 100 ms period as described above.

While FIG. 5 illustrates the activity level determination module 505 and access timing parameter module 410-a functions being performed by the multi-mode device 135-c, it is to be understood that the such functions may be performed on a device separate from the multi-mode device 135-c. For example, as will be described below, the device 135-c communicates with an access point (AP), back-end server, base station, etc. and these devices may provide activity level and/or access timing parameter information to the multi-mode device 135-c. For example, multi-mode device 135-c may receive commands to change access timing parameters from an AP. In some examples, the AP may instruct the multi-mode device 135-c to change access timing parameters through management frames. The changes applied to these parameters may depend on the level of DSRC activities, similarly as described above, for example.

Figure 6:
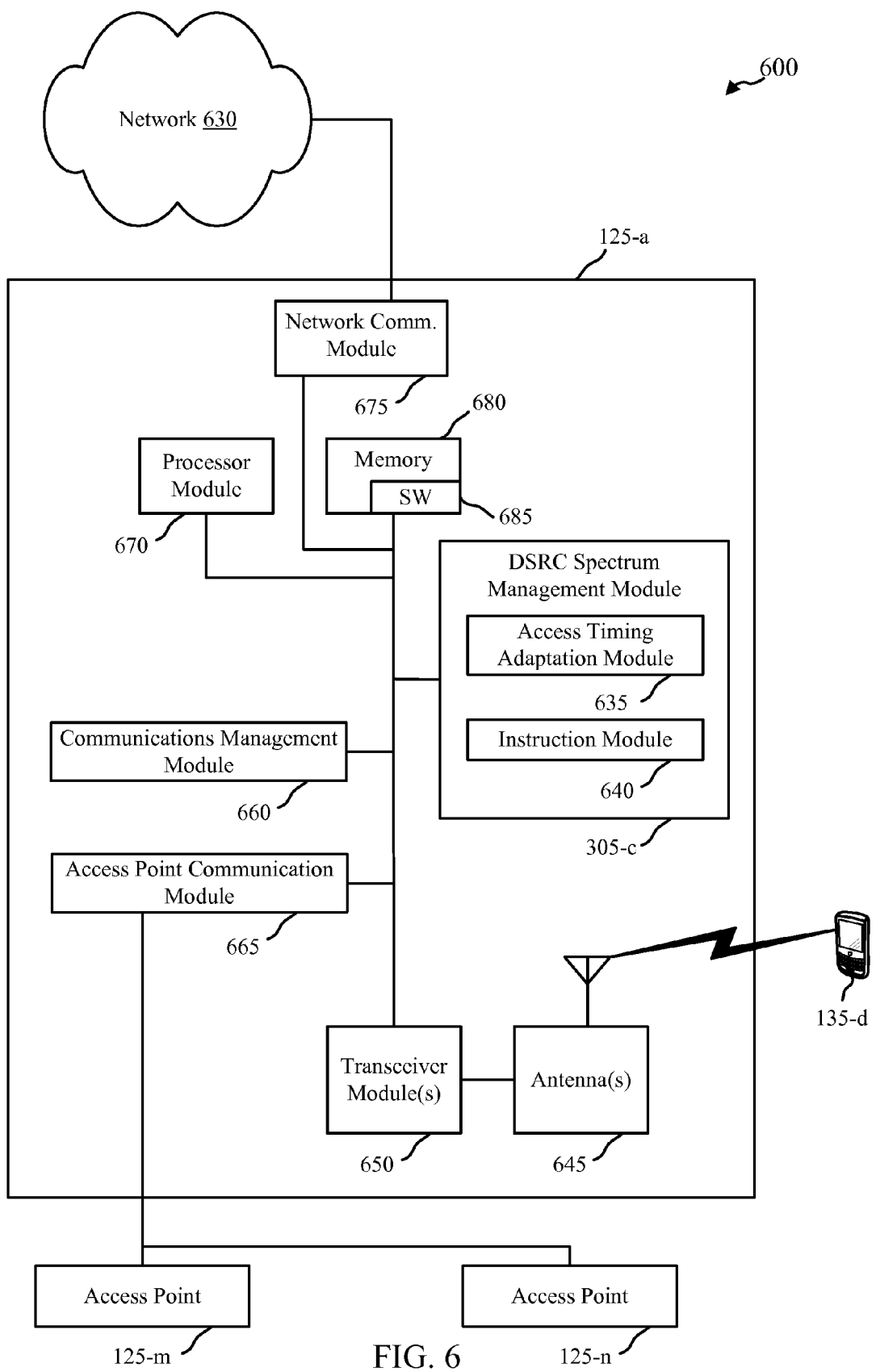
FIG. 6 shows a block diagram of a communications system that may be configured for managing the use of the DSRC spectrum.

FIG. 6 shows a block diagram of a communications system 600 that may be configured for managing the use of the DSRC spectrum by a multi-mode device 135. This system 600 may be an example of aspects of the system 100 depicted in FIG. 1, and/or access point 125 of FIG. 1. System 600 may include an access point 125-a. The access point 125-a may include antenna(s) 645, a transceiver module 650, memory 680, and a processor module 670, which each may be in communication, directly or indirectly, with each other (e.g., over one or more buses). The transceiver module 650 may be configured to communicate bi-directionally, via the antenna(s) 645, with the multi-mode device 135-d. The multi-mode device 135-d may be an example of the device 135 of FIGS. 1, 3, 4, and/or 5. The transceiver module 650 (and/or other components of the access point 125-a) may also be configured to communicate bi-directionally with one or more networks 630. In some cases, the access point 125-a may communicate with the core network 630 through network communications module 675. Access point 125-a may be an example of a Wi-Fi access point, an eNodeB base station, a Home eNodeB base station, a NodeB base station, and/or a Home NodeB base station, for example.

Access point 125-a may also communicate with other access points 125, such as access point 125-m and access point 125-n. Each of the access points 125 may communicate with multi-mode device 135-d using different wireless communications technologies, such as different Radio Access Technologies. In some cases, access point 125-a may communicate with other access points such as 125-m and/or 125-n utilizing access point communication module 665. In some embodiments, access point communication module 665 may provide an interface within a wireless communication technology to provide communication between some of the access points 125. In some embodiments, access point 125-a may communicate with other access points through the core network 630.

The memory 680 may include random access memory (RAM) and read-only memory (ROM). The memory 680 may also store computer-readable, computer-executable software code 685 containing instructions that are configured to, when executed, cause the processor module 670 to perform various functions described herein (e.g., DSRC spectrum management). Alternatively, the software code 685 may not be directly executable by the processor module 670 but be configured to cause the computer, e.g., when compiled and executed, to perform functions described herein.

The processor module 670 may include an intelligent hardware device, e.g., a central processing unit (CPU), a microcontroller, an application-specific integrated circuit (ASIC), etc. The transceiver module 650 may include a modem configured to modulate the packets and provide the modulated packets to the antenna(s) 645 for transmission, and to demodulate packets received from the antenna(s) 645.

According to the architecture of FIG. 6, the access point 125-a may further include a communications management module 660. The communications management module 660 may manage communications with other access points 125. By way of example, the communications management module 660 may be a component of the access point 125-a in communication with some or all of the other components of the access point 125-a via a bus. Alternatively, functionality of the communications management module 660 may be implemented as a component of the transceiver module 650, as a computer program product, and/or as one or more controller elements of the processor module 670.

In one example, the access point 125-*a* may include a DSRC spectrum management module 305-*c*. The management module 305-*c* may include an access timing adaptation module 635 and an instruction module 640. In one embodiment, the access point 125-*a* may receive information from one or more multi-mode devices 135-*d* and determine that DSRC communications are available. The access timing adaptation module 635 may modify one or more access parameters in a similar manner as described above to provide priority to transmissions of DSRC devices using the DSRC spectrum. Based on the determination that DSRC spectrum is available and adapted access timing parameters from access timing adaptation module 635, the instruction module 640 may generate instructions to be transmitted to the one or more devices 135-*d*. The instructions may indicate whether or not the devices 135 are to be operated in DSRC spectrum, and may also indicate access timing parameters, or other parameters, to be used in such access. Additionally, in the case where one or more devices 135-*d* are operating using DSRC spectrum, the management module 305-*c* may determine that DSRC spectrum should no longer be used, and instruction module 640 may generate such instructions.

In some embodiments, the transceiver module 650 in conjunction with antenna(s) 645, along with other possible components of access point 125-*a*, may transmit DSRC instructions to one or more multi-mode devices 135-*d*. As previously described, the instructions may indicate whether the devices 135-*d* are allowed to operate in the DSRC spectrum. The determination to allow the use of the DSRC spectrum may depend, in some examples, on an activity level of DSRC transmissions within the DSRC spectrum. The activity level of DSRC transmissions may be determined through any of a number of mechanisms, such as from a device 135-*d*, or other devices, through communications from another access point 125-*m* or 125-*n*, or through network 630, for example. The determination to allow the use of the DSRC spectrum may depend, in some examples, on the location of the multi-mode device 135-*d*. The device 135-*d* may transmit location information to the access point 125-*a*. The access point 125-*a* may determine whether to allow the multi-mode device 135-*d* to use the DSRC spectrum based on the received location information.

Figure 7:
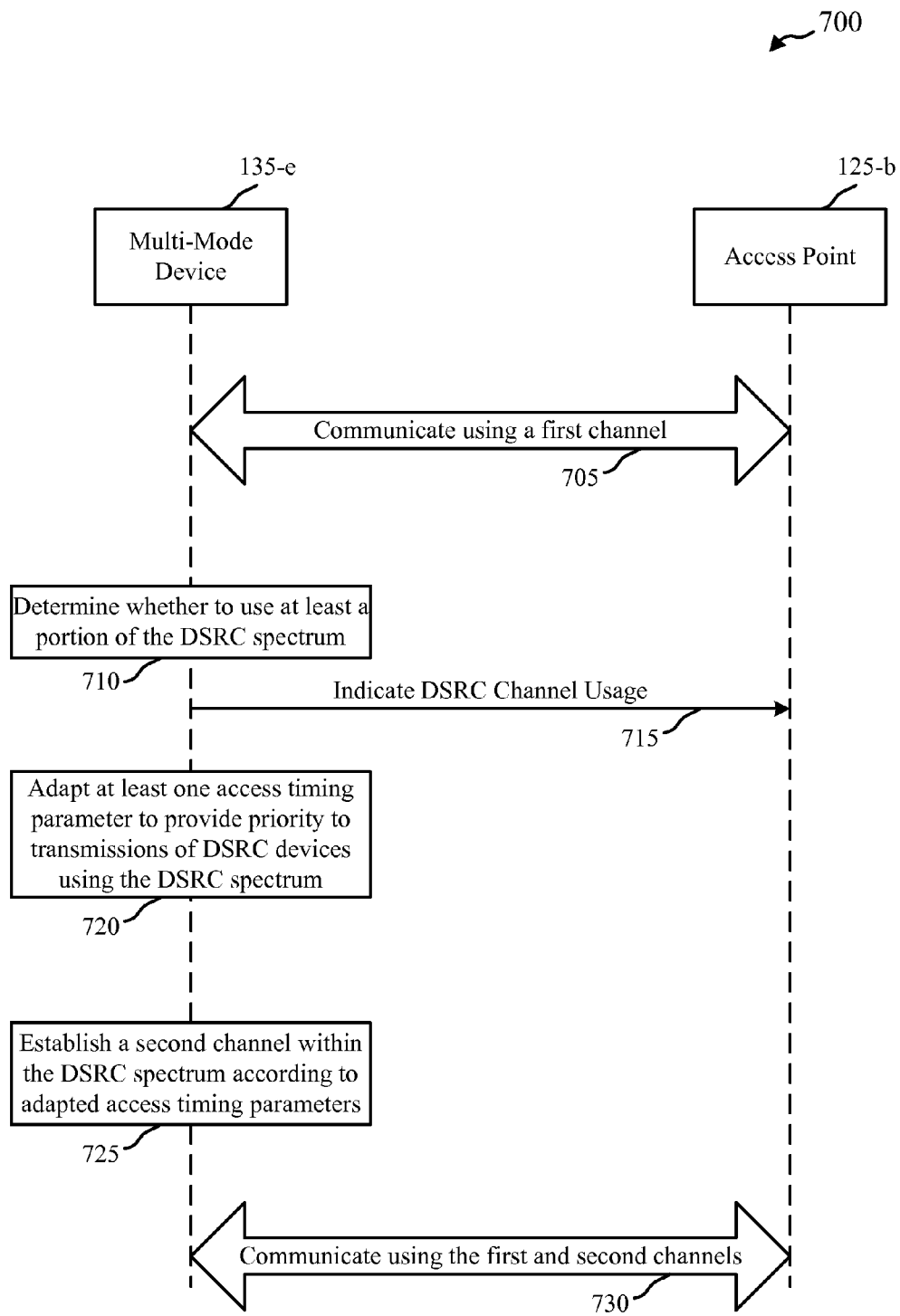
FIG. 7 is a message flow diagram illustrating one example of communications between a multi-mode device and an access point to manage the use of the DSRC spectrum.

FIG. 7 is a message flow diagram 700 illustrating one example of communications between a multi-mode device 135-*e* and an access point 125-*b*. The multi-mode device 135-*e* may be an example of the devices 135 of FIGS. 1, 3, 4, and/or 5. The access point 125-*b* may be an example of the access points 125 illustrated in FIGS. 1 and/or 6.

In one embodiment, the multi-mode device 135-*e* may communicate using a first channel 705. In one configuration, the first channel may be outside of the DSRC spectrum. The multi-mode device 135-*e* may determine whether to use at least a portion of the DSRC spectrum. In one configuration, the multi-mode device 135-*e* may determine 710 whether it is allowed to operate using at least a portion of the DSRC spectrum. Such a determination may be made according to one or more conditions associated with the DSRC spectrum, similarly as described above. For example, the multi-mode device 135-*e* may analyze activity on the DSRC spectrum to determine whether it may use a portion of the DSRC spectrum. In some examples, the determination 710 may be made based on instructions received from access point 125-*b* via the first channel. The multi-mode device 135-*e* indicates DSRC channel usage 715 to the access point, and adapts 720 at least one access timing parameter to provide priority to transmissions of DSRC devices using the DSRC spectrum. The device 135-*e* may establish 725 a second channel. The second channel may be within at least a portion of the DSRC spectrum. The multi-mode device 135-*e* and the access point 125-*b* may engage in communications 730 using the DSRC spectrum.

Figure 8:
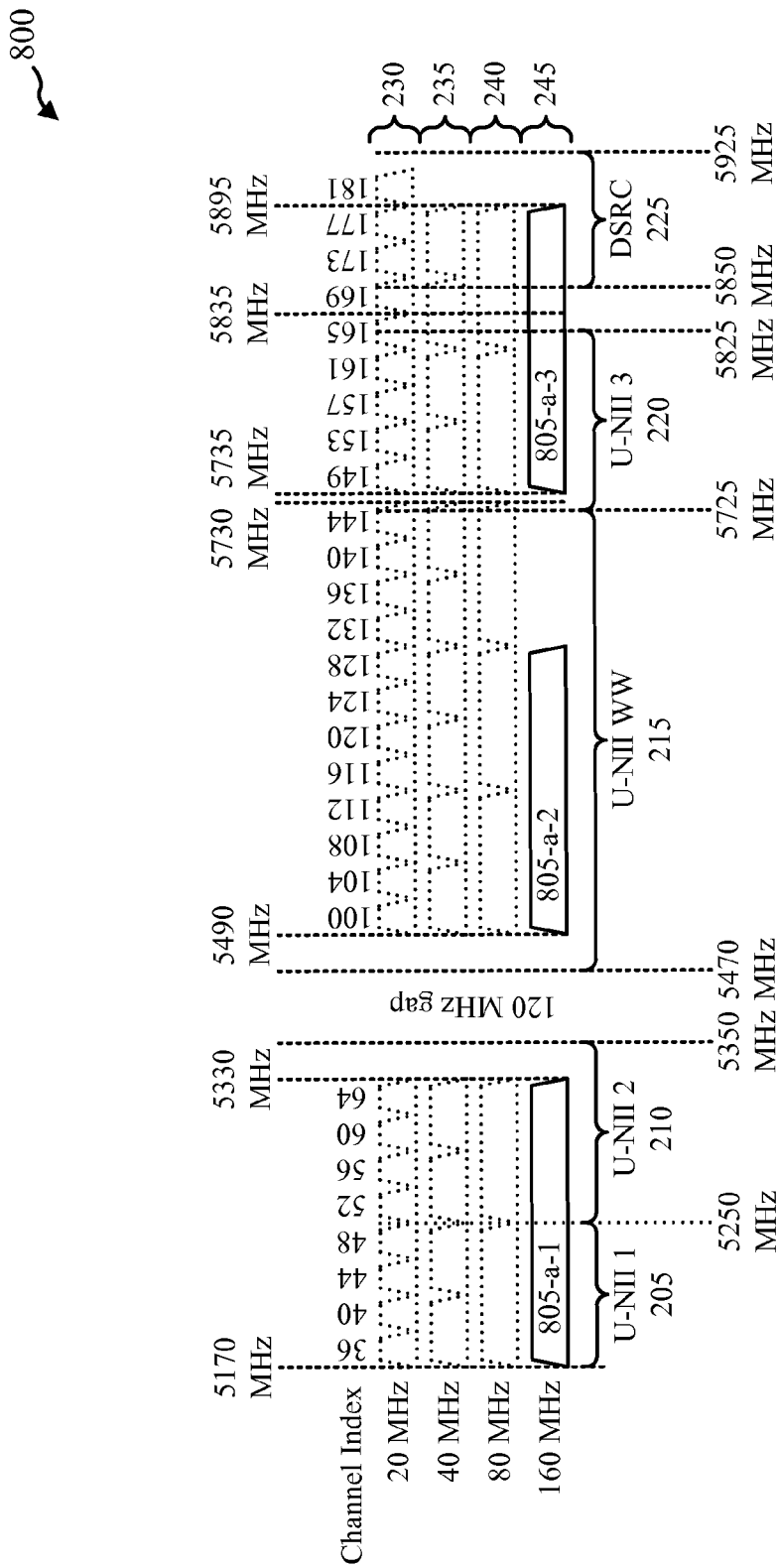
FIG. 8 is a diagram illustrating allocations bandwidth for various frequency bands along a frequency spectrum that may be used for communications.

FIG. 8 shows an exemplary view of various spectrum allocations in the 5 GHz spectrum 800 and the use of the DSRC spectrum by a multi-mode device 135. As previously described, the spectrum 800 may include different allocations of frequency bands along the spectrum 800. In one configuration, each frequency band allocation may use a certain number of frequency channels. Each channel may occupy a certain amount of bandwidth. As illustrated, the U-NII 1 frequency band 205 may support up to four 20 MHz channels 230, two 40 MHz channels 235, or one 80 MHz channel 240. Similarly, the U-NII 2 frequency band 210 may support up to four 20 MHz channels 230, two 40 MHz channels 235, or one 80 MHz channel 240. As previously stated, neither the U-NII 1 frequency band 205 nor the U-NII 2 frequency band 210 may individually support a 160 MHz channel 805-*a*-1. However, since a multi-mode device 135 may operate across both bands, 205, 210, the device may effectively use the 160 MHz channel across both frequency bands.

As further illustrated, the U-NII WW band 215 may support a 160 MHz channel 805-*a*-2. A 160 MHz channel 805-*a*-3 may also be supported across the bands for the U-NII 3 frequency band 220 and the DSRC frequency band 225. In one embodiment, when a multi-mode device 135 determines that it may use at least a portion of DSRC spectrum 225, the bandwidth for the transmissions of the device 135 may be increased as the device may operate on the 160 MHz channel 805-*a*-1 across the UNIT 1 205 and U-NII 2 210 bands, the 160 MHZ channel 805-*a*-2 in the U-NII WW band 215, as well as the 160 MHz channel 805-*a*-3 across the U-NII 3 spectrum 220 and the DSRC spectrum 225. This increase in bandwidth for the multi-mode device's 135 transmissions may enable increased data rates, which may allow for higher throughput.

Figure 9:
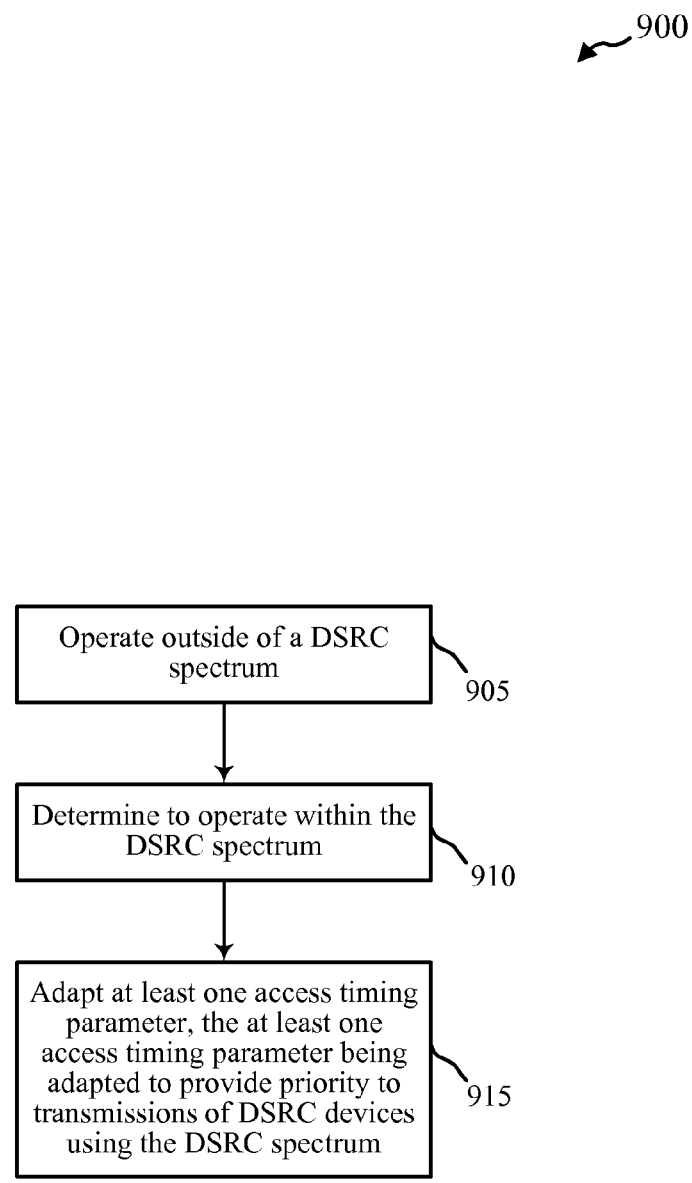
FIG. 9 is a flow chart illustrating one embodiment of a method for adapting access timing parameters when using the DSRC spectrum.

FIG. 9 is a flow chart illustrating one embodiment of a method 900 for managing the use of the DSRC spectrum while maintaining priority for DSRC communications of DSRC devices. For clarity, the method 900 is described with reference to the multi-mode device 135 of FIGS. 1, 3, 4, 5, and/or 7. In one implementation, the DSRC management module 305 of FIGS. 3, 4, and/or 5 may execute one or more sets of codes to control the functional elements of the multi-mode device 135 to perform the functions described below.

At block 905, a wireless multi-mode device is operated outside of the DSRC spectrum. At block 910, the multi-mode device may determine to operate within the DSRC spectrum. The determination may be based on the activity level of transmissions within the DSRC spectrum, the location of the multi-mode device, etc. At block 915, the multi-mode device may adapt at least one access timing parameter to operate within the DSRC spectrum. In one configuration, the at least one access timing parameter may be adapted to provide priority to transmissions of DSRC devices using the DSRC spectrum. For example, adapting an access timing parameter may include increasing a duration of a SIFS to be at least equal to a duration of a SIFS used by a DSRC device. In other examples, adapting an access may include increasing a slot-time used for access timing to be at least equal to a slot-time used for access timing of a DSRC device. Such an increased slot-time may be used to compute an increased duration of a distributed coordination function (DCF) inter-frame spacing (DIFS), an increased duration of an extended inter-frame spacing (EIFS), and an increased duration of an arbitration inter-frame spacing (AIFS). Additionally or alternatively, adapting an access timing parameter may include adapting a backoff timer used by the multi-mode device.

Therefore, the method 900 may provide for use of the DSRC spectrum while also providing priority to transmissions of DSRC devices using the DSRC spectrum. It should be noted that the method 900 is just one implementation and that the operations of the method 900 may be rearranged or otherwise modified such that other implementations are possible.

Figure 10:
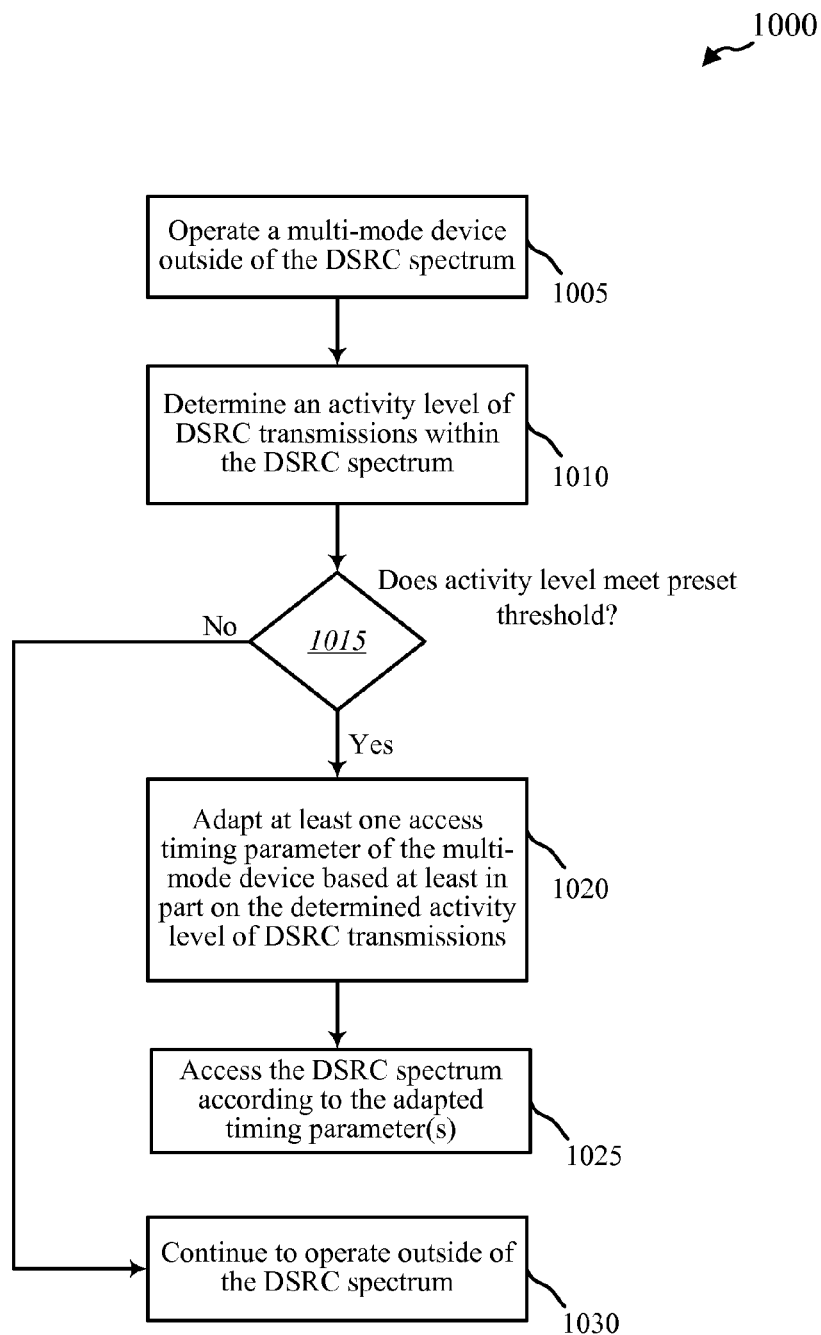
FIG. 10 is a flow chart illustrating a further embodiment of a method for adapting access timing parameters when using the DSRC spectrum.

FIG. 10 is a flow chart illustrating one embodiment of a method 1000 for managing the use of the DSRC spectrum while maintaining priority to transmissions of DSRC devices using the DSRC spectrum. For clarity, the method 1000 is described with reference to the multi-mode device 135 of FIGS. 1, 3, 4, 5, and/or 7. In one implementation, the DSRC management module 305 of FIGS. 3, 4, and/or 5 may execute one or more sets of codes to control the functional elements of the multi-mode device 135 to perform the functions described below.

At block 1005, a multi-mode device 135 is operated outside of the DSRC spectrum. At block 1010, an activity level of DSRC transmissions within the DSRC spectrum is determined. The activity level of DSRC transmissions may be determined, for example, through monitoring of traffic in the DSRC spectrum or through some other entity such as an access point. At block 1015, a determination may be made as to whether the activity level meets a preset threshold. In one embodiment, the preset threshold may be an amount of available resources to safely provide additional traffic of multi-mode device 135 with little or no impact on transmission times for DSRC transmissions. If it is determined that the activity level meets the preset threshold, at block 1020, the device 135 may adapt at least one access timing parameter based at least in part on the determined activity level of DSRC transmissions. At block 1025, the device 135 may access the DSRC spectrum according to the adapted timing parameter(s). If, however, it is determined that the activity level does not meet the preset threshold, the multi-mode device 135 may continue to operate outside of the DSRC spectrum, as indicated at block 1030.

Accordingly, the method 1000 may provide for determining whether to operate within the DSRC spectrum based on the activity of DSRC communications of DSRC devices. It should be noted that the method 1000 is just one implementation and that the operations of the method 1000 may be rearranged or otherwise modified such that other implementations are possible.

Figure 11:
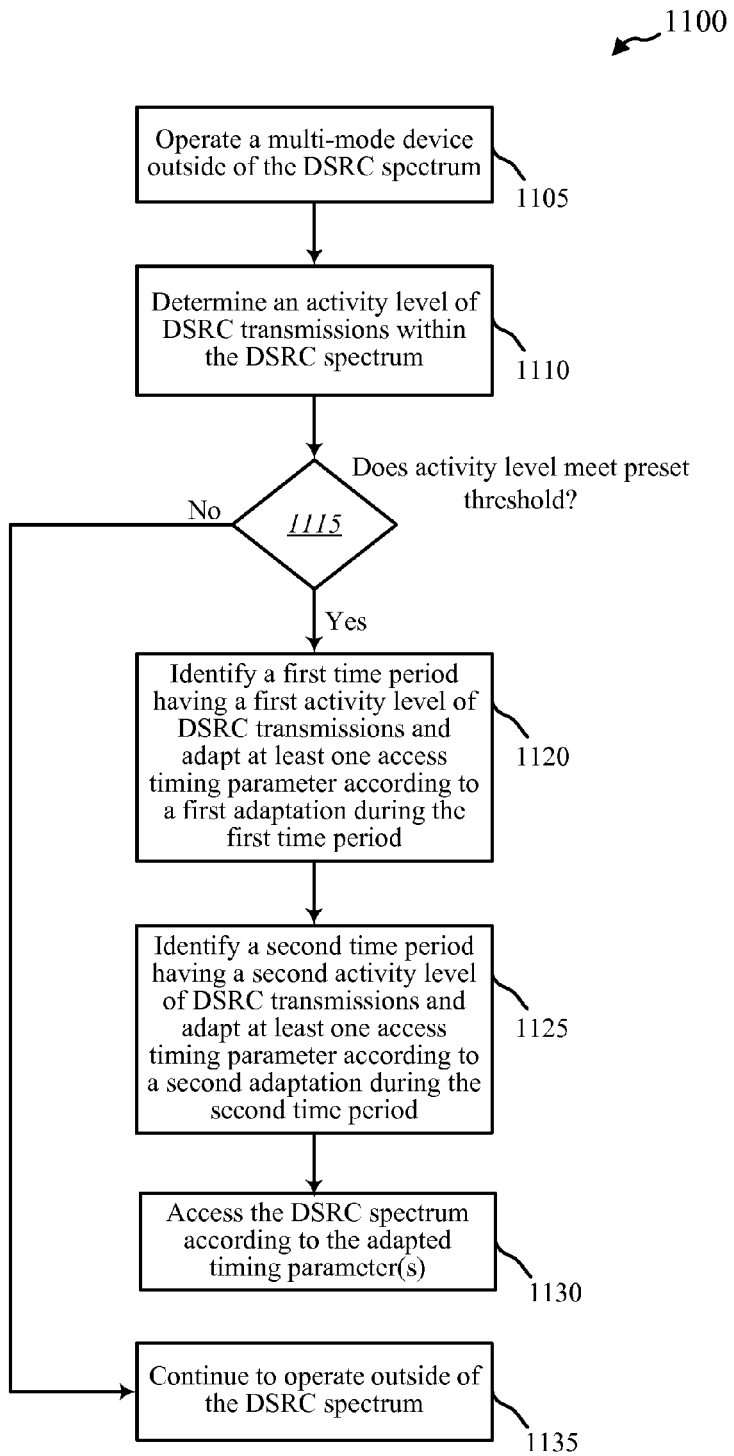
FIG. 11 is a flow chart illustrating another embodiment of a method of adapting access timing parameters when using the DSRC spectrum.

FIG. 11 is a flow chart illustrating another embodiment of a method 1100 for managing the use of the DSRC spectrum based on location information. For clarity, the method 1100 is described with reference to the multi-mode device 135 of FIGS. 1, 3, 4, 5, and/or 7. In one implementation, the DSRC management module 305 of FIGS. 3, 4, and/or 5 may execute one or more sets of codes to control the functional elements of the multi-mode device 135 to perform the functions described below.

At block 1105, a multi-mode device 135 is operated outside of the DSRC spectrum. At block 1110, an activity level of DSRC transmissions within the DSRC spectrum is determined. The activity level of DSRC transmissions may be determined, for example, through monitoring of traffic in the DSRC spectrum or through receipt of information from some other entity such as an access point. At block 1115, a determination may be made as to whether the activity level meets a preset threshold. In one embodiment, the preset threshold may be an amount of available resources to safely provide additional traffic of multi-mode device 135 with little or no impact on transmission times for DSRC transmissions. If it is determined that the activity level meets the preset threshold, at block 1120, the device 135 may identify a first time period having a first activity level of DSRC transmissions and adapt at least one access timing parameter according to a first adaptation during the first time period.

As mentioned above, to accommodate single-channel radios (only receive or transmit on a single 10 MHz channel but not simultaneously), DSRC standards allow a FDMA/TDMA channel access mechanism. According to this mechanism, time is divided into repetitive 100 ms periods. The first 50 ms may be allocated to a control channel (CCH) and the second 50 ms may be allocated to a shared channel (SCH). Many safety-type messages of DSRC communications will be sent on the CCH during the first 50 ms period. As a result, many important DSRC activities may occur during the first 50 ms of each 100 ms period. In the example of FIG. 11, a multi-mode device 135 may change access timing parameters differently for each of the 50 ms periods. For example, during the first time period, one or more access timing parameters may be adapted to be longer than the access timing parameters used by DSRC devices so as to provide the DSRC devices with an increased priority to use the DSRC spectrum during this first time period.

With continued reference to FIG. 11, the method, at block 1125, identifies a second time period having a second activity level of DSRC transmissions and adapts at least one access timing parameter according to a second adaptation during the second time period. With continued reference to the single-channel radio example, during the second 50 ms period, the multi-mode device 135 may change the one or more access timing parameters to be equal to the parameters used by DSRC devices. At block 1130, the multi-mode device may access the DSRC spectrum according to the adapted timing parameter(s). If, however, it is determined that the activity level does not meet the preset threshold at determination 1115, the multi-mode device 135 may continue to operate outside of the DSRC spectrum, as indicated at block 1135.

Therefore, the method 1100 may provide for determining whether to operate within the DSRC spectrum based on the activity of DSRC communications of DSRC devices during different time periods. It should be noted that the method 1100 is just one implementation and that the operations of the method 1100 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for adapting access timing parameters when using an unlicensed dedicated spectrum, comprising:
    identifying at least one access timing parameter of a multi-mode device, the at least one access timing parameter used by the multi-mode device for operation of the multi-mode device outside the unlicensed dedicated spectrum;
    adapting a duration of the at least one access timing parameter of the multi-mode device, the adapted at least one access timing parameter used by the multi-mode device for operation of the multi-mode device within the unlicensed dedicated spectrum, wherein the adapted duration of the at least one access timing parameter provides priority, over the multi-mode device, to transmissions of devices for which the unlicensed dedicated spectrum is allocated; and
    accessing at least a portion of the unlicensed dedicated spectrum based at least in part on the adapted duration of the at least one of the access timing parameters that provides the priority to transmissions of devices for which the unlicensed dedicated spectrum is allocated.

2. The method of claim 1, wherein adapting the duration of at least one access timing parameter of the multi-mode device comprises:
increasing a duration of a short inter-frame spacing (SIFS) to be greater than a duration of a SIFS used by a device for which the unlicensed dedicated spectrum is allocated.

3. The method of claim 1, wherein adapting the duration of at least one access timing parameter of the multi-mode device comprises:
increasing a slot-time used for access timing to be greater than a slot-time used for access timing of a device for which the unlicensed dedicated spectrum is allocated, the increased slot-time being used to compute an increased duration of a distributed coordination function (DCF) inter-frame spacing (DIFS), an increased duration of an extended inter-frame spacing (EIFS), and an increased duration of an arbitration inter-frame spacing (AIFS).

4. The method of claim 1, wherein adapting the duration of at least one access timing parameter of the multi-mode device comprises:
adapting a backoff timer used by the multi-mode device.

5. The method of claim 1, further comprising:
determining an activity level of unlicensed dedicated spectrum transmissions within the unlicensed dedicated spectrum; and
determining whether to use the unlicensed dedicated spectrum for transmissions of the multi-mode device based at least in part on the determined activity level of unlicensed dedicated spectrum transmissions.

6. The method of claim 5, wherein,
upon determining to use the unlicensed dedicated spectrum, the adapting of the duration of the at least one access timing parameter of the multi-mode device is based at least in part on the determined activity level of unlicensed dedicated transmissions.

7. The method of claim 5, further comprising:
identifying a first time period comprising a first activity level of unlicensed dedicated spectrum transmissions;
identifying a second time period comprising a second activity level of unlicensed dedicated spectrum transmissions, the second activity level being different from the first activity level;
adapting the at least one access timing parameter according to a first adaptation during the first time period; and
adapting the at least one access timing parameter according to a second adaptation during the second time period, the second adaption being different from the first adaptation.

8. The method of claim 1, further comprising:
transmitting an activity level within the unlicensed dedicated spectrum.

9. The method of claim 1, further comprising:
receiving an instruction from an access point (AP) indicating the adaptation to apply to the duration of at least one access timing parameter of the multi-mode device, the instruction based at least in part on an activity level within the unlicensed dedicated spectrum.

10. The method of claim 1, further comprising:
further adapting the duration of the at least one access timing parameter of the multi-mode device, the further adapted at least one access timing parameter used by the multi-mode device for operation of the multi-mode device outside the unlicensed dedicated spectrum.

11. An apparatus for adapting access timing parameters when using an unlicensed dedicated spectrum, comprising:
means for identifying at least one access timing parameter of a multi-mode device, the at least one access timing parameter used by the multi-mode device for operation of the multi-mode device outside the unlicensed dedicated spectrum;
means for adapting a duration of the at least one access timing parameter of the multi-mode device, the adapted at least one access timing parameter used by the multi-mode device for operation of the multi-mode device within the unlicensed dedicated spectrum, wherein the adapted duration of the at least one access timing parameter provides priority, over the multi-mode device, to transmissions of devices for which the unlicensed dedicated spectrum is allocated; and
means for accessing at least a portion of the unlicensed dedicated spectrum based at least in part on the adapted duration of the at least one of the access timing parameters that provides the priority to transmissions of devices for which the unlicensed dedicated spectrum is allocated.

12. The apparatus of claim 11, wherein the means for adapting the duration of at least one access timing parameter of the multi-mode device comprises:
means for increasing a duration of a short inter-frame spacing (SIFS) to be greater than a duration of a SIFS used by a device for which the unlicensed dedicated spectrum is allocated.

13. The apparatus of claim 11, wherein the means for adapting the duration of at least one access timing parameter of the multi-mode device comprises:
means for increasing a slot-time used for access timing to be greater than a slot-time used for access timing of a device for which the unlicensed dedicated spectrum is allocated, the increased slot-time being used to compute an increased duration of a distributed coordination function (DCF) inter-frame spacing (DIFS), an increased duration of an extended inter-frame spacing (EIFS), and an increased duration of an arbitration inter-frame spacing (AIFS).

14. The apparatus of claim 11, wherein the means for adapting the duration of at least one access timing parameter of the multi-mode device comprises:
means for adapting a backoff timer used by the multi-mode device.

15. The apparatus of claim 11, further comprising:
means for determining an activity level of unlicensed dedicated spectrum transmissions within the unlicensed dedicated spectrum; and
means for determining whether to use the unlicensed dedicated spectrum for transmissions of the multi-mode device based at least in part on the determined activity level of unlicensed dedicated spectrum transmissions.

16. The apparatus of claim 15,
wherein the means for adapting the duration of the at least one access timing parameter of the multi-mode device includes means for adapting the duration based at least in part on the determined activity level of unlicensed dedicated transmissions.

17. The apparatus of claim 15, further comprising:
means for identifying a first time period comprising a first activity level of unlicensed dedicated spectrum transmissions;

means for identifying a second time period comprising a second activity level of unlicensed dedicated spectrum transmissions, the second activity level being different from the first activity level;
means for adapting the at least one access timing parameter according to a first adaptation during the first time period; and
means for adapting the at least one access timing parameter according to a second adaptation during the second time period, the second adaption being different from the first adaptation.

18. The apparatus of claim 11, further comprising:
means for transmitting an activity level within the unlicensed dedicated spectrum.

19. The apparatus of claim 11, further comprising:
means for receiving an instruction from an access point (AP) indicating the adaptation to apply to the at least one access timing parameter of the multi-mode device, the instruction based at least in part on an activity level within the unlicensed dedicated spectrum.

20. The apparatus of claim 11, further comprising:
means for further adapting the duration of the at least one access timing parameter of the multi-mode device, the further adapted at least one access timing parameter used by the multi-mode device for operation of the multi-mode device outside the unlicensed dedicated spectrum.

21. A multi-mode device configured to adapt access timing parameters when using an unlicensed dedicated spectrum, comprising:
a processor;
memory in electronic communication with the processor; and
instructions being stored in the memory, the instructions being executable by the processor to:
identify at least one access timing parameter of a multi-mode device, the at least one access timing parameter used by the multi-mode device for operation of the multi-mode device outside the unlicensed dedicated spectrum;
adapt a duration of the at least one access timing parameter of the multi-mode device, the adapted at least one access timing parameter used by the multi-mode device for operation of the multi-mode device within the unlicensed dedicated spectrum, wherein the adapted duration of the at least one access timing parameter provides priority, over the multi-mode device, to transmissions of devices for which the unlicensed dedicated spectrum is allocated; and
access at least a portion of the unlicensed dedicated spectrum based at least in part on the adapted duration of the at least one of the access timing parameters that provides the priority to transmissions of devices for which the unlicensed dedicated spectrum is allocated.

22. The multi-mode device of claim 21, wherein the instructions to adapt the duration of at least one access timing parameter of the multi-mode device are executable by the processor to:
increase a duration of a short inter-frame spacing (SIFS) to be greater than a duration of a SIFS used by a device for which the unlicensed dedicated spectrum is allocated.

23. The multi-mode device of claim 21, wherein the instructions to adapt the duration of at least one access timing parameter of the multi-mode device are executable by the processor to:
increase a slot-time used for access timing to be greater than a slot-time used for access timing of a device for which the unlicensed dedicated spectrum is allocated, the increased slot-time being used to compute an increased duration of a distributed coordination function (DCF) inter-frame spacing (DIFS), an increased duration of an extended inter-frame spacing (EIFS), and an increased duration of an arbitration inter-frame spacing (AIFS).

24. The multi-mode device of claim 21, wherein the instructions to adapt the duration of at least one access timing parameter of the multi-mode device are executable by the processor to:
adapt a backoff timer used by the multi-mode device.

25. The multi-mode device of claim 21, wherein the instructions are further executable by the processor to:
determine an activity level of unlicensed dedicated spectrum transmissions within the unlicensed dedicated spectrum; and
determine whether to use the unlicensed dedicated spectrum for transmissions of the multi-mode device based at least in part on the determined activity level of unlicensed dedicated spectrum transmissions.

26. The multi-mode device of claim 25, wherein the instructions to adapt the duration of the at least one access timing parameter of the multi-mode device are further executable by the processor to:
adapt the duration of the at least one access timing parameter of the multi-mode device based at least in part on the determined activity level of unlicensed dedicated transmissions.

27. The multi-mode device of claim 25, wherein the instructions are further executable by the processor to:
identify a first time period comprising a first activity level of unlicensed dedicated spectrum transmissions;
identify a second time period comprising a second activity level of unlicensed dedicated spectrum transmissions, the second activity level being different from the first activity level;
adapt the at least one access timing parameter according to a first adaptation during the first time period; and
adapt the at least one access timing parameter according to a second adaptation during the second time period, the second adaption being different from the first adaptation.

28. The multi-mode device of claim 21, wherein the instructions are further executable by the processor to:
transmit an activity level within the unlicensed dedicated spectrum.

29. The multi-mode device of claim 21, wherein the instructions are further executable by the processor to:
receive an instruction from an access point (AP) indicating the adaptation to apply to the duration of at least one access timing parameter of the multi-mode device, the instruction based at least in part on an activity level within the unlicensed dedicated spectrum.

30. The multi-mode device of claim 21, wherein the instructions are further executable by the processor to:
further adapt the duration of the at least one access timing parameter of the multi-mode device, the further adapted at least one access timing parameter used by the multi-mode device for operation of the multi-mode device outside the unlicensed dedicated spectrum.

31. A non-transitory computer-readable medium to adapt access timing parameters when using an unlicensed dedicated spectrum, the non-transitory computer-readable medium storing instructions executable by a processor to:

identify at least one access timing parameter of a multi-mode device, the at least one access timing parameter used by the multi-mode device for operation of the multi-mode device outside the unlicensed dedicated spectrum;

adapt a duration of the at least one access timing parameter of the multi-mode device, the adapted at least one access timing parameter used by the multi-mode device for operation of the multi-mode device within the unlicensed dedicated spectrum, wherein the adapted duration of the at least one access timing parameter provides priority, over the multi-mode device, to transmissions of devices for which the unlicensed dedicated spectrum is allocated; and access at least a portion of the unlicensed dedicated spectrum based at least in part on the adapted duration of the at least one of the access timing parameters that provides the priority to transmissions of devices for which the unlicensed dedicated spectrum is allocated.

32. The non-transitory computer-readable medium of claim 31, wherein the instructions to adapt the duration of at least one access timing parameter of the multi-mode device are executable by the processor to:

increase a duration of a short inter-frame spacing (SIFS) to be greater than a duration of a SIFS used by a device for which the unlicensed dedicated spectrum is allocated.

33. The non-transitory computer-readable medium of claim 31, wherein the instructions to adapt the duration of at least one access timing parameter of the multi-mode device are executable by the processor to:

increase a slot-time used for access timing to be greater than a slot-time used for access timing of a device for which the unlicensed dedicated spectrum is allocated, the increased slot-time being used to compute an increased duration of a distributed coordination function (DCF) inter-frame spacing (DIFS), an increased duration of an extended inter-frame spacing (EIFS), and an increased duration of an arbitration inter-frame spacing (AIFS).

34. The non-transitory computer-readable medium of claim 31, wherein the instructions to adapt the duration of at least one access timing parameter of the multi-mode device are executable by the processor to:

adapt a backoff timer used by the multi-mode device.

35. The non-transitory computer-readable medium of claim 31, wherein the instructions are further executable by the processor to:

determine an activity level of unlicensed dedicated spectrum transmissions within the unlicensed dedicated spectrum; and determine whether to use the unlicensed dedicated spectrum for transmissions of the multi-mode device based at least in part on the determined activity level of unlicensed dedicated spectrum transmissions.

36. The non-transitory computer-readable medium of claim 25, wherein the instructions to adapt the duration of the at least one access timing parameter of the multi-mode device are further executable by the processor to:

adapt the duration of the at least one access timing parameter of the multi-mode device based at least in part on the determined activity level of unlicensed dedicated transmissions.

37. The computer program product of claim 25, wherein the instructions are further executable by the processor to:

identify a first time period comprising a first activity level of unlicensed dedicated spectrum transmissions;

identify a second time period comprising a second activity level of unlicensed dedicated spectrum transmissions, the second activity level being different from the first activity level;

adapt the at least one access timing parameter according to a first adaptation during the first time period; and adapt the at least one access timing parameter according to a second adaptation during the second time period, the second adaption being different from the first adaptation.

38. The non-transitory computer-readable medium of claim 31, wherein the instructions are further executable by the processor to:

transmit an activity level within the unlicensed dedicated spectrum.

39. The non-transitory computer-readable medium of claim 31, wherein the instructions are further executable by the processor to:

receive an instruction from an access point (AP) indicating the adaptation to apply to the duration of at least one access timing parameter of the multi-mode device, the instruction based at least in part on an activity level within the unlicensed dedicated spectrum.

40. The non-transitory computer-readable medium of claim 31, wherein the instructions are further executable by the processor to:

further adapt the duration of the at least one access timing parameter of the multi-mode device, the further adapted at least one access timing parameter used by the multi-mode device for operation of the multi-mode device outside the unlicensed dedicated spectrum.

* * * * *